United States Patent
Liu (10) Patent No.: US 10,484,949 B2
(45) Date of Patent: *Nov. 19, 2019

(54) UPLINK POWER CONTROL METHOD, USER EQUIPMENT AND BASE STATION

(71) Applicant: Huawei Technologies Co., Ltd., Shenzhen (CN)

(72) Inventor: Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,424

(22) Filed: Jan. 5, 2017

(65) Prior Publication Data

US 2017/0118720 A1 Apr. 27, 2017

Related U.S. Application Data

(63) Continuation of application No. 14/183,101, filed on Feb. 18, 2014, now Pat. No. 9,578,603, which is a
(Continued)

(30) Foreign Application Priority Data

Aug. 18, 2011 (CN) .......................... 2011 1 0237430

(51) Int. Cl.
*H04W 52/14* (2009.01)
*H04W 52/24* (2009.01)
(Continued)

(52) U.S. Cl.
CPC ......... *H04W 52/146* (2013.01); *H04L 5/0035* (2013.01); *H04L 5/0051* (2013.01);
(Continued)

(58) Field of Classification Search
CPC ....... H04B 7/0626; H04B 7/06; H04L 1/0025; H04L 1/0026; H04L 1/0031;
(Continued)

(56) References Cited

U.S. PATENT DOCUMENTS 8,982,801 B2 3/2015 Shin et al.
9,173,205 B2 10/2015 Lee et al.
(Continued)

FOREIGN PATENT DOCUMENTS

CN 101420702 A 4/2009
CN 101902750 A 12/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, pp. 1-176, 3rd Generation Partnership Project, Valbonne, France (Jun. 2013).
(Continued)

*Primary Examiner* — Alejandro Rivero
*Assistant Examiner* — Paul P Tran
(74) *Attorney, Agent, or Firm* — Leydig, Voit & Mayer, Ltd.

(57) ABSTRACT

Embodiments of the present disclosure provide an uplink power control method, a user equipment and a base station. The method comprises: receiving configuration information of a channel state information reference signal CSI-RS from the base station, wherein the configuration information of the CSI-RS comprises reference signal port information and reference signal power information; and measuring a path loss for uplink power control based on the configuration information of the CSI-RS. The embodiments of the present disclosure use the CSI-RS to measure the path loss, which
(Continued)

differs from a common CRS in that the CSI-RS may aim at a specific base station. Therefore, path loss measurement may be performed in respect of a target base station of uplink transmission, enabling the path loss compensation to match the actual path loss, thus improving the performance of uplink power control.

12 Claims, 3 Drawing Sheets

Related U.S. Application Data continuation of application No. PCT/CN2012/079914, filed on Aug. 10, 2012.

(51) Int. Cl.

| | | |
|---|---|---|
| *H04W 52/40* | (2009.01) | |
| *H04W 72/04* | (2009.01) | |
| *H04L 5/00* | (2006.01) | |
| *H04W 52/32* | (2009.01) | |
| *H04W 88/08* | (2009.01) | |

(52) U.S. Cl.
CPC ....... *H04W 52/242* (2013.01); *H04W 52/245* (2013.01); *H04W 52/40* (2013.01); *H04W 72/042* (2013.01); *H04L 5/0023* (2013.01); *H04W 52/325* (2013.01); *H04W 88/085* (2013.01)

(58) Field of Classification Search
CPC ... H04L 1/1657; H04L 1/1671; H04L 5/0023; H04L 5/0035; H04L 5/0048; H04L 5/0051; H04L 5/0053; H04L 5/0055; H04L 5/0057; H04L 5/0096; H04L 27/261; H04W 5/0035; H04W 5/0051; H04W 48/12; H04W 52/0229; H04W 52/04; H04W 52/10; H04W 52/146; H04W 52/16; H04W 52/216; H04W 52/242; H04W 52/244; H04W 52/245; H04W 52/246; H04W 52/30; H04W 52/32; H04W 52/325; H04W 52/343; H04W 52/34; H04W 52/40; H04W 72/02; H04W 72/0413; H04W 72/042; H04W 72/046; H04W 72/04; H04W 74/004; H04W 74/0833; H04W 88/085
USPC ....... 370/252, 311, 315, 328, 329, 331, 332; 375/219, 224, 260; 455/67.11, 422.1, 455/436, 450, 456.1, 507, 509, 522
See application file for complete search history.

(56) References Cited

U.S. PATENT DOCUMENTS

| | | |
|---|---|---|
| 9,325,443 B2 | 4/2016 | Kishiyama et al. |
| 2010/0167672 A1* | 7/2010 | Ahn ................. H01Q 1/243 455/132 |
| 2010/0254471 A1* | 10/2010 | Ko ................. H04L 5/0023 375/260 |
| 2010/0323720 A1* | 12/2010 | Jen ................. H04B 7/2606 455/456.1 |
| 2011/0038271 A1 | 2/2011 | Shin et al. |
| 2011/0039561 A1* | 2/2011 | Narasimha ......... H04W 52/146 455/436 |
| 2011/0171992 A1* | 7/2011 | Seo ................. H04W 52/10 455/522 |
| 2011/0237270 A1 | 9/2011 | Noh et al. |
| 2012/0039282 A1* | 2/2012 | Kim ................. H04W 48/12 370/329 |
| 2012/0207119 A1* | 8/2012 | Zhang ............... H04L 5/0023 370/329 |
| 2012/0250558 A1 | 10/2012 | Chung et al. |
| 2012/0281555 A1 | 11/2012 | Gao et al. |
| 2013/0028217 A1* | 1/2013 | Sumasu ............. H04J 11/0023 370/329 |
| 2013/0040578 A1* | 2/2013 | Khoshnevis ........ H04W 52/242 455/67.11 |
| 2013/0094384 A1* | 4/2013 | Park ................. H04B 7/0626 370/252 |
| 2014/0141830 A1* | 5/2014 | Skov ................. H04W 52/10 455/522 |

FOREIGN PATENT DOCUMENTS

| | | |
|---|---|---|
| CN | 101986752 A | 3/2011 |
| WO | 2010091425 A2 | 8/2010 |

OTHER PUBLICATIONS

"Uplink Power Control Discussion for CoMP Scenario 4," 3GPP TSG-RAN WG1 #65, Barcelona, Spain, R1-111598, 3rd Generation Partnership Project, Valbonne, France (May 9-13, 2011).
"Signaling design for CSI-RS," 3GPP TSG RAN WG1 Meeting #62bis, Xi'an, China, R1-105162, 3rd Generation Partnership Project, Valbonne, France (Oct. 11-15, 2010).
"Uplink enhancements for new deployment scenarios," 3GPP TSG-RAN WG1 Meeting#66, Athens, Greece, R1-112320, 3rd Generation Partnership Project,Valbonne, France (Aug. 22-26, 2011).
"DL RS RAN1 Chairman's Notes," 3GPP TSG RAN WG1 Meeting #62bis, Xi'an, China, R1-105803, 3rd Generation Partnership Project, Valbonne, France (Oct. 11-15, 2010).
"On CSI RS Design," 3GPP TSG-RAN WG1 #59bis, Valencia, Spain, R1-100416, 3rd Generation Partnership Project, Valbonne, France (Jan. 18-22, 2010).

* cited by examiner

UPLINK POWER CONTROL METHOD, USER EQUIPMENT AND BASE STATION

CROSS-REFERENCE TO RELATED APPLICATIONS

This application is a continuation of U.S. patent application Ser. No. 14/183,101, filed on Feb. 18, 2014, which is a continuation of International Patent Application No. PCT/CN2012/079914, filed on Aug. 10, 2012, which claims priority to Chinese Patent Application No. 201110237430.1, filed on Aug. 18, 2011. The afore-mentioned patent applications are hereby incorporated by reference in their entireties.

FIELD OF TECHNOLOGY

The embodiments of the present disclosure relate to the technical field of communications, and in particular to an uplink power control method, a user equipment and a base station.

BACKGROUND

In the 3rd Generation Partnership Project (3GPP), defined are four scenarios for Coordinated Multi-Point (CoMP) transmission, wherein the scenario 4 means that transmission points including Macro Site and Remote Radio Head (RRH), within a macro station area share an identical Cell Identity, and this architecture is also referred to as a Distributed Antenna System (DAS).

In the DAS system, in order that the receiving powers of different User Equipments (UE) upon reaching a base station (eNB, evolved Node B) are roughly on the same level to avoid inter-user interference caused by the near-far effect, uplink power control is generally adopted for the UE. In Long Term Evolution (LTE) R-10 standards, the transmitting powers of a Physical Uplink Shared Channel (PUSCH), a Physical Uplink Control Channel (PUCCH) and a Sounding Reference Signal (SRS) are determined according to a Path Loss (PL) estimated on the UE side, specifically shown in formula (1) below:

$$PL = ReferenceSignalPower - RSRP \quad (1)$$

where ReferenceSignalPower is a reference signal power defined by the base station, and the UE acquires the reference signal power through a cell specific high-layer signaling; and RSRP is a Reference Signal Receiving Power measured by the UE at a Common Reference Signal (CRS) antenna Port0 or Port1.

In present scenario 4, the path loss is measured on the basis of the CRS by adopting the aforementioned formula (1), wherein CRS Port0 and Port1 may be virtually mapped to antennas of respective RRHs for transmission, and the UE may receive CRSs transmitted from the respective RRHs.

The RSRP is a superposition of energy of measurement reference signals from the respective RRHs, which are received by the UE, as shown in formula (2) below:

$$RSRP = 10\log_{10}\left(\sum_{i=0}^{N-1} 10^{\frac{(P_i - PL_i)}{10}}\right) \quad (2)$$

The path loss may be obtained as $$PL = 10\log_{10}\left(\sum_{i=0}^{N-1} P_i\right) - 10\log_{10}\left(\sum_{i=0}^{N-1} 10^{\frac{(P_i - PL_i)}{10}}\right) \quad (3)$$

$$= 10\log_{10}\left(\frac{\sum_{i=0}^{N-1} P_i}{\sum_{i=0}^{N-1} 10^{\frac{(P_i - PL_i)}{10}}}\right)$$

where $P_i$ is transmitting power of each RRH, and $PL_i$ is path loss from each RRH to the UE.

Thus, it can be seen that, because the receiving power is the superposition of the energy of the signals from different RRHs, the path loss measured on the basis of the CRS by using the aforementioned formula (3) is a nonlinear superposition of path losses from all the RRHs to the UE. The actual uplink target RRH is one of the RRHs or a set of multiple RRHs rather than all the RRHs. In such case, the actual path loss compensation in respect of the target RRH does not match the measured path loss, so that the calculation of the uplink transmitting power is inaccurate, and then the performance of uplink transmission is affected.

SUMMARY

Provided in the embodiments of the present disclosure are an uplink power control method, a user equipment and a base station, which can improve performance of uplink power control.

In one aspect, provided is an uplink power control method, including: receiving configuration information of a channel state information reference signal CSI-RS from a base station, wherein the configuration information of the CSI-RS includes reference signal port information and reference signal power information; and measuring a path loss for uplink power control based on the configuration information of the CSI-RS.

In another aspect, provided is an uplink power control method, including: generating configuration information of a channel state information reference signal CSI-RS, wherein the configuration information of the CSI-RS includes reference signal port information and reference signal power information; and sending the configuration information of the CSI-RS to a user equipment, for the user equipment to measure a path loss for uplink power control based on the configuration information of the CSI-RS.

In another aspect, provided is a user equipment, including: a receiving unit, configured to receive configuration information of a channel state information reference signal CSI-RS from a base station, wherein, the configuration information of the CSI-RS includes reference signal port information and reference signal power information; and a measuring unit, configured to measure a path loss for uplink power control based on the configuration information of the CSI-RS.

In another aspect, provided is a base station, including: a generating unit, configured to generate configuration information of a channel state information reference signal CSI-RS, wherein, the configuration information of the CSI-RS includes reference signal port information and reference signal power information; and a sending unit, configured to send the configuration information of the CSI-RS to user equipment, for the user equipment to measure a path loss for uplink power control based on the configuration information of the CSI-RS.

The embodiments of the present disclosure use the CSI-RS to measure the path loss, which differs from a common CRS in that the CSI-RS may aim at a specific base station. Therefore, path loss measurement may be performed in respect of a target base station of uplink transmission, enabling the path loss compensation to match the actual path loss, thus improving the performance of uplink power control.

BRIEF DESCRIPTION OF THE DRAWINGS

In order to illustrate the technical solution in the embodiments of the present disclosure more clearly, brief description will be made below to the drawings required in the embodiments or the prior art, and apparently, the drawings described below are some embodiments of the present disclosure only, and other drawings could be obtained based on these drawings by those of ordinary skill in the art without creative efforts.

DETAILED DESCRIPTION OF THE EMBODIMENTS

The technical solution in the embodiments of the present disclosure will be described clearly and fully below in conjunction with the drawings in the embodiments of the present disclosure, and apparently, the embodiments described are only part of embodiments of the present disclosure, not all of them. Based on the embodiments in the present disclosure, all the other embodiments obtained by those of ordinary skill in the art without creative efforts shall fall within the protection scope of the present disclosure.

The technical solution of the present disclosure may be applied to various communication systems, such as Global System of Mobile communication (GSM), Code Division Multiple Access (CDMA) system, Wideband Code Division Multiple Access Wireless (WCDMA) system, General Packet Radio Service (GPRS) system, Long Term Evolution (LTE) system, long term evolution advance (LTE-A) system and the like.

A user equipment (UE) may also be referred to as Mobile Terminal, mobile user equipment and the like, and may communicate with one or more core networks through a Radio Access Network (RAN). The user equipment may be a mobile phone (or referred to as "cell" phone) or a computer with a mobile terminal, for example, a portable, a pocket, a handheld, a computer built-in or a vehicle-mounted mobile device, which exchanges language and/or data with the radio access network.

A base station may be a Base Transceiver Station (BTS) in GSM or CDMA, a NodeB in WCDMA or evolutional Node B (eNB or e-NodeB, evolutional Node B) in LTE or LTE-A, and is not limited in the present disclosure.

Figure 1:
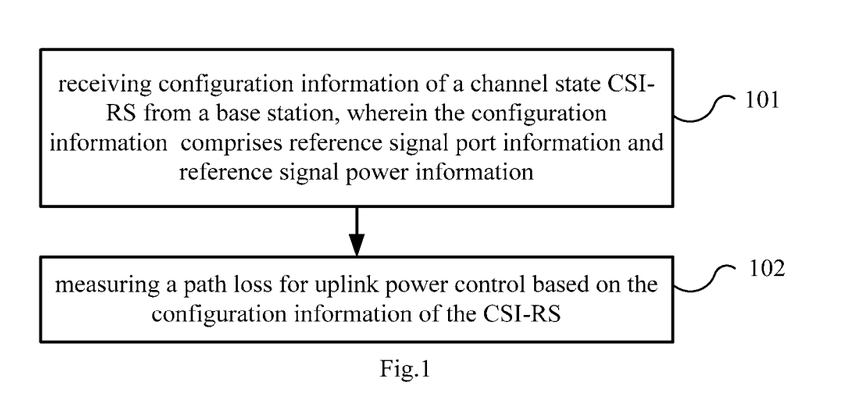
FIG. 1 is a flowchart of an uplink power control method of an embodiment of the present disclosure.

FIG. 1 is a flowchart of an uplink power control method of an embodiment of the present disclosure. The method of FIG. 1 is performed by a user equipment.

Step 101, receiving configuration information of a Channel State Information Reference Signal (CSI-RS) from a base station, wherein the configuration information of the CSI-RS includes reference signal port information and reference signal power information.

Because the CSI-RS may aim at the specific base station, the CSI-RS configuration information sent by the base station may include corresponding antenna port information of a target base station (such as RRH) for uplink transmission, namely, the reference signal port information, to indicate an antenna port required for measurement. CSI-RSs of different antenna ports may be configured for different RRHs. For example, CSI-RSs of 2 antenna ports may be configured for RRH1, and CSI-RSs of 8 antenna ports may be configured for RRH2.

Alternatively, as an embodiment, the reference signal port information may include a set consisting of path loss measurement indications of respective antenna ports. In other words, the reference signal port information may be an explicit indication in respect of each antenna port for indicating whether a path loss measurement is performed on the antenna port based on CSI-RS. For example, the set of the path loss measurement indications may include a reference signal port bitmap of CSI-RS configurations of 1 antenna port, or include a concatenation of reference signal port bitmaps of CSI-RS configurations of all the antenna port numbers.

Alternatively, as another embodiment, the reference signal port information may include a set consisting of RSRP measurement indications of respective antenna ports and a subset selection indication of the set. The measurement indication of RSRP and corresponding subset selection indication may combinatively and implicitly indicate whether a path loss measurement is performed on an antenna port based on CSI-RS. For example, the set of the RSRP measurement indications may include a reference signal port bitmap of CSI-RS configurations of 1 antenna port, or include a concatenation of reference signal port bitmaps of CSI-RS configurations of all the antenna port numbers.

Alternatively, as another embodiment, the reference signal port information may include a set consisting of RSRP measurement indications of respective antenna ports and CSI-RS muting information configured by the base station. In other words, the measurement indication of RSRP and the muting information may combinatively and implicitly indicate whether a path loss measurement is performed on an antenna port based on CSI-RS. For example, the subset selection indication of the set may include an indication bitmap corresponding to the set.

Alternatively, as another embodiment, the reference signal port information and the reference signal power information mentioned above may be received through a high-layer signaling or a dynamic signaling. The reference signal port information and the reference signal power information may be transmitted together or separately. Moreover, the reference signal port information and the reference signal power information do not need to correspond to each other one-to-one.

Step 102, measuring a path loss for uplink power control based on the configuration information of the CSI-RS.

Alternatively, as an embodiment, an antenna port to be measured is determined on the basis of the reference signal port information, the RSRP of the CSI-RS is measured on the determined antenna port, and the path loss is determined according to the measured RSRP and the reference signal power information.

Alternatively, as another embodiment, when the configuration information further includes an identification bit for indicating function of the reference signal port information, the measurement operation may be performed according to the identification bit. For example, when the identification bit indicates that the reference signal port information is used for channel state information (CSI) measurement, the channel state information on an antenna port indicated by the reference signal port information, such as precoding matrix index (PMI, Precoding Matrix Index), rank index (RI), channel quality information (CQI) and the like, is measured. In addition, when the identification bit indicates that the reference signal port information is used for RSRP measurement, the process of measuring the RSRP of the CSI-RS on the determined antenna port and the process of determining the path loss according to the measured RSRP and the reference signal power information are performed. Alternatively, the identification bit may be transmitted through a high-layer signaling or a dynamic signaling. For example, the identification bit may be transmitted together with the reference signal port information and the reference signal power information mentioned above or separately transmitted. Moreover, the identification bit is not required to be in one-to-one correspondence to the reference signal port information. For example, an identification bit may indicate the function(s) of one or more pieces of reference signal port information or the functions of corresponding indications of one or more ports in a piece of reference signal port information.

Alternatively, as another embodiment, each indication in the aforementioned configuration information may aim at one or more antenna ports. For example, when there are multiple antenna ports to be measured, which are determined on the basis of the reference signal port information, the path losses of respective antenna ports are determined, and the path loss for uplink power control is comprehensively determined according to the path losses of respective antenna ports.

Alternatively, as another embodiment, the aforementioned reference signal power information may include a transmitting power of the CSI-RS or a difference between a transmitting power of the CSI-RS and a transmitting power of the CRS. Here, the unit of aforementioned transmitting power or the difference is db.

For example, when the reference signal power information includes the transmitting power of the CSI-RS, the path loss on a certain antenna port is equal to the value of subtracting the RSRP measured on the antenna port from the transmitting power of the CSI-RS. Or, when the reference signal power information includes the difference between the transmitting power of the CSI-RS and the transmitting power of the CRS, the path loss on a certain antenna port is equal to the value of subtracting the RSRP measured on the antenna port from the sum of the difference and the transmitting power of the CRS. Here, the unit of the path loss is db.

The embodiment of the present disclosure uses the CSI-RS to measure the path loss, which differs from a common CRS in that the CSI-RS may aim at the specific base station. Therefore, path loss measurement may be performed in respect of a target base station of uplink transmission, enabling the path loss compensation to match the actual path loss, thus improving the performance of uplink power control.

Figure 2:
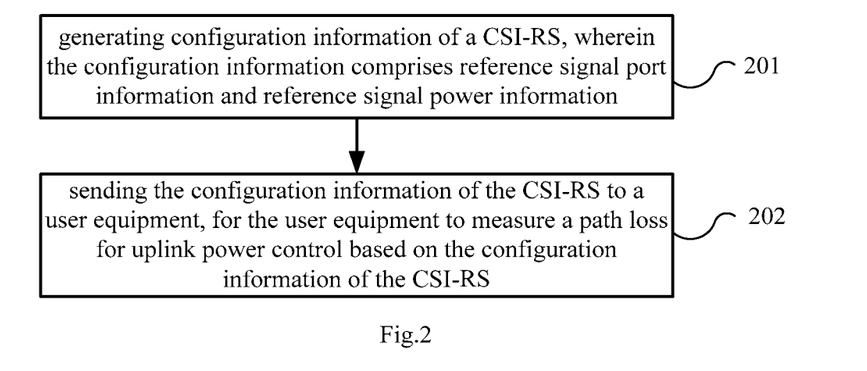
FIG. 2 is a flowchart of an uplink power control method of another embodiment of the present disclosure.

FIG. 2 is a flowchart of an uplink power control method of another embodiment of the present disclosure. The method of FIG. 2 is performed by a base station (such as eNodeB of a serving cell of UE), and corresponds to the method of FIG. 1, so repetitive description is appropriately omitted.

Step 201, generating configuration information of a CSI-RS, wherein the configuration information of the CSI-RS includes reference signal port information and reference signal power information.

Alternatively, as an embodiment, the reference signal port information may include a set consisting of path loss measurement indications of respective antenna ports. In other words, the reference signal port information may be an explicit indication in respect of each antenna port for indicating whether a path loss measurement is performed on the antenna port based on CSI-RS. For example, the set of the path loss measurement indications may include a concatenation of reference signal port bitmaps of CSI-RS configurations of all the antenna port numbers, and may also adopt other appropriate indication modes.

Alternatively, as another embodiment, the reference signal port information may include a set consisting of RSRP measurement indications of respective antenna ports and a subset selection indication of the set. The measurement indication of RSRP and corresponding subset selection indication may combinatively and implicitly indicate whether a path loss measurement is performed on an antenna port based on CSI-RS. For example, the set of the RSRP measurement indications may include a reference signal port bitmap of CSI-RS configurations of 1 antenna port, or include a concatenation of reference signal port bitmaps of CSI-RS configurations of all the antenna port numbers, and may also adopt other appropriate indication modes.

Alternatively, as another embodiment, the reference signal port information may include a set consisting of RSRP measurement indications of respective antenna ports and CSI-RS muting information configured by the base station. In other words, the measurement indication of RSRP and the muting information may combinatively and implicitly indicate whether a path loss measurement is performed on an antenna port based on CSI-RS. For example, the subset selection indication of the set may include an indication bitmap corresponding to the set, and may also adopt other appropriate indication modes.

Step 202, sending the configuration information of the CSI-RS to a user equipment, for the user equipment to measure a path loss for uplink power control based on the configuration information of the CSI-RS.

Alternatively, as an embodiment, the configuration information of the CSI-RS may be sent to the user equipment through a high-layer signaling or a dynamic signaling. Various information included in the configuration information may be sent together or separately. For example, the reference signal port information and the reference signal power information do not need to be subjected to one-to-one correspondence. In the case where the configuration information includes an identification bit, the identification bit may be transmitted through a high-layer signaling or a dynamic signaling, for example, may be transmitted together with the reference signal port information and the reference signal power information mentioned above or separately transmitted. Moreover, the identification bit is not required to be in one-to-one correspondence to the reference signal port information.

The embodiment of the present disclosure uses the CSI-RS to measure the path loss, which differs from a common CRS in that the CSI-RS may aim at the specific base station. Therefore, path loss measurement may be performed in respect of a target base station of uplink transmission, enabling the path loss compensation to match the actual path loss, thus improving the performance of uplink power control.

The embodiments of the present disclosure are described in details below in conjunction with specific examples. In the examples below, UE indicates a user equipment; and eNodeB indicates a serving base station of the UE, such as a macro base station.

Embodiment I

UE receives CSI-RS configuration information sent by an eNodeB. The configuration information includes reference signal port information and reference signal power information. In this embodiment, the reference signal port information is an explicit indication, for example, may adopt a form of bitmap.

For example, suppose that the reference signal port information adopts a reference signal port bitmap of CSI-RS configurations (the number of CSI-RS port is 1) of 1 antenna port. Table 1 is an example of a CSI-RS configuration table. As shown in table 1, the total number of CSI-RS configurations of 1 antenna port is 32, a bitmap of 32 bits may be used, and each bit of the bitmap indicates whether path loss measurement is performed for the corresponding antenna port. For example, bit 1 indicates path loss measurement to be performed, bit 0 indicates no path loss measurement to be performed, and vice versa. The "mod" in table 1 is a modulus operation.

For example, the bitmap "10100000000000000000000000000000" indicates that the UE measures RSRP at the first antenna port (suppose that the antenna port is CSI_RS1) corresponding to the corresponding first CSI-RS pattern in table 1 and calculates the corresponding path loss $PL_1$. Meanwhile, the UE measures RSRP at the first antenna port (suppose that the antenna port is CSI_RS2) corresponding to the corresponding third CSI-RS pattern in table 1 and calculates the corresponding path loss $PL_2$. Then, the UE integrates the path losses $PL_1$ and $PL_2$ measured on the two antenna ports to calculate the path loss $PL_{target}$ for uplink power control. The measurement mode for more or fewer antenna ports is similar.

TABLE 1

CSI-RS configuration table

| | CSI-RS configurations | Number of CSI-RS antenna port(s) 1 or 2 | | | | | |
|---|---|---|---|---|---|---|---|
| | | time-frequency location (k', l') | slot $n_s$ mod2 | 4 (k', l') | $n_s$ mod2 | 8 (k', l') | $n_s$ mod2 |
| first-type subframe structure and second-type subframe structure | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |

TABLE 1-continued

CSI-RS configuration table

| | CSI-RS configurations | Number of CSI-RS antenna port(s) 1 or 2 | | | | | |
|---|---|---|---|---|---|---|---|
| | | time-frequency location (k', l') | slot $n_s$ mod2 | 4 (k', l') | $n_s$ mod2 | 8 (k', l') | $n_s$ mod2 |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| second-type subframe structure | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

In an embodiment, the $PL_{target}$ for uplink power control may be calculated according to formula (4) below:

$$PL_{target} = -10\log \sum_i \omega_i 10^{\frac{PL_i}{10}} \qquad (4)$$

where $PL_i$ is the path loss corresponding to the antenna port, and $\omega_i$ is a weight factor. It is to be noted that, the unit of the PL in the formula (4) is db.

For the CSI-RS configurations of antenna ports of another number (2, 4 or 8), corresponding CSI-RSs may be divided into several 1-antenna-port CSI-RSs, one of the 1-antenna-port CSI-RSs is selected, and a corresponding bit is used to indicate whether the CSI-RS is used for measuring the path loss.

Figure 3:
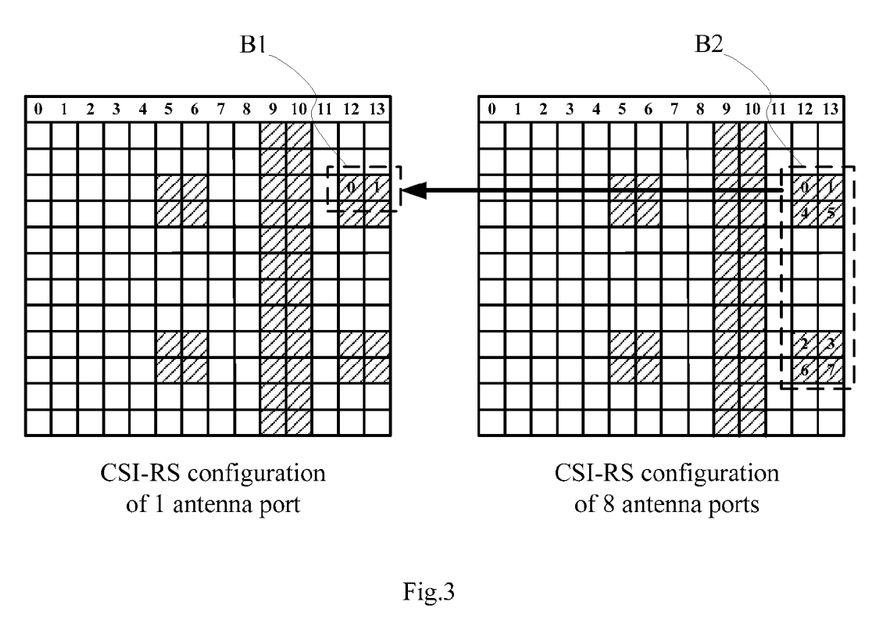
FIG. 3 is a schematic view of an example of CSI-RS pattern of an embodiment of the present disclosure.

FIG. 3 is a schematic view of an example of CSI-RS patterns of an embodiment of the present disclosure. The example of FIG. 3 corresponds to Table 1 above. For clarity, FIG. 3 only shows the patterns of CSI-RS configurations of 1 antenna port and CSI-RS configurations of 8 antenna ports, and the patterns of the configurations of antenna ports of another number are similar. Shadow blocks in FIG. 3 indicate resources available for CSI-RSs, and correspond to each CSI-RS configuration in table 1 respectively.

Suppose that the eNodeB requires the UE to measure the path loss information of a certain RRH, the RRH corresponds to the CSI-RSs configured for 8 antenna ports, and the time-frequency location of the RRH is (9,5) of the second slot (slot) of the 8 antenna ports configured in table 1, which indicates the CSI-RSs of the 8 antenna ports using the 9$^{th}$ subcarrier and the 5$^{th}$ OFDM (Orthogonal Frequency Division Multiplexing, orthogonal frequency division multiplexing) symbol of the second slot as a starting point, namely, the CSI-RSs of the dashed box B2 in FIG. 3. The CSI-RSs in the dashed box B2 may be divided into CSI-RSs of four 1 antenna ports, such as (0, 1), (4, 5), (2, 3) and (6, 7). The eNodeB may select one of the CSI-RSs, such as the CSI-RS of 1 antenna port corresponding to (0, 1), namely the CSI-RS in the dashed box B1. The CSI-RS in the dashed box B1 is informed to the UE in the form of a corresponding bit in a bitmap, namely, the 5$^{th}$ bit of the bitmap is set as 1. Of course, the corresponding bit location of another CRI-RS in the CSI-RSs of the four 1 antenna ports may be selected for indicating the measurement indications of all ports of the RRH.

The UE measures the RSRP of the corresponding antenna port according to the reference signal port information set as above and calculates the path loss of the corresponding RRH according to the corresponding power value included in the reference signal power information.

The reference signal power information is information related with CSI-RS power, and for example is indicated as Pd. For example, the reference signal power information may include a difference between a transmitting power of the CSI-RS and a transmitting power of the CRS, and may otherwise include an absolute power of the CSI-RS, namely a transmitting power of the CSI-RS.

The condition of the aforementioned two antenna ports CSI_RS1 and CSI_RS2 is taken as an example. If the reference signal power information is the difference between the transmitting power of the CSI-RS and the transmitting power of the CRS and is Pd1 and Pd2 respectively, the path losses $PL_1$ and $PL_2$ of the two antenna ports may be calculated according to formula (5) below:

$$PL = ReferenceSignalPower - RSRP1 + Pd,$$

$$PL_2 = ReferenceSignalPower - RSRP2 + Pd2 \quad (5)$$

wherein ReferenceSignalPower is the transmitting power of the CRS, and may be transmitted to the UE by the eNodeB in the configuration information of the CRS. RSRP1 is RSRP measured on the antenna port CSI_RS1, and RSRP2 is RSRP measured on the antenna port CSI_RS2.

If the reference signal power information Pd is the transmitting power of the CSI-RS, the path losses $PL_1$ and $PL_2$ of the two antenna ports are calculated according to formula (6) below:

$$PL = Pd1 - RSRP1,$$

$$PL_2 = Pd2 - RSRP2 \quad (6)$$

After the corresponding path loss of each antenna port is obtained, the path loss $PL_{target}$ for uplink power control may be finally obtained according to formula (4) above. The $PL_{target}$ obtained in this way is well-targeted, so that the performance of uplink power control is improved. However, the embodiments of the present disclosure are not limited to this, and the path loss $PL_{target}$ for uplink power control may also be obtained in other modes.

As an example, when it is determined, based on the reference signal port information, that multiple antenna ports are to be measured, the RSRPs measured on one or more subsets of the multiple antenna ports are averaged (including weighted average), then path losses corresponding to the aforementioned one or more subsets are obtained according to the averaged RSRP, and the path loss $PL_{target}$ for uplink power control is obtained according to the corresponding path losses.

Specifically, suppose that the RRHs required for uplink transmission are RRH1 and RRH2, the RRH1 corresponds to the CSI-RS configurations of 2 ports, and the RRH2 corresponds to the CSI-RS configurations of 8 ports. The RSRPs measured on the 2 ports corresponding to the RRH1 are averaged to obtain averaged RSRP1. Meanwhile, RSRPs measured on the 8 ports corresponding to the RRH2 are averaged to obtain averaged RSRP2. The RSRP1 and the RSRP2 are substituted into the aforementioned formula (5) or (6) to obtain the corresponding path losses $PL_1$ and $PL_2$, and then the path loss $PL_{target}$ for uplink power control is finally obtained according to the aforementioned formula (4). That is to say, $PL_i$ in the aforementioned formula (4) indicates the path loss of a respective subset in multiple antenna ports.

If there are more RRHs required for uplink transmission, or two or more RRHs correspond to the same CSI-RS configuration, the aforementioned method may be similarly adopted, where the RSRPs measured on part or all of the ports are averaged, and then the path loss $PL_{target}$ for uplink power control is obtained.

In this way, the RSRPs measured on multiple antenna ports may be averaged, so that the performance of uplink power control is improved. Moreover, the reference signal power information required to be transmitted is less, and only one piece of reference signal power information needs to be transmitted for each subset.

It is to be noted that, the unit of each parameter in the aforementioned formulae (4)-(6) is db. If the absolute value of a linear domain is used for calculation, the aforementioned formulae are correspondingly transformed into multiplications or divisions for calculation. Such equivalent transformations fall into the scope of the embodiments of the present disclosure.

Embodiment II

Embodiment II is different from embodiment I in that the reference signal port information adopts a concatenation of reference signal port bitmaps of CSI-RS configurations of all ports. For example, according to table 1, the number of the CSI-RS configurations of 1 antenna port is 32, the number of the CSI-RS configurations of 2 antenna ports is 32, the number of the CSI-RS configurations of 4 antenna ports is 16, and the number of the CSI-RS configurations of 8 antenna ports is 8. Therefore, concatenation bitmaps b0 b1 b2 b3 b4 b5 b6 b7 . . . b31 b32 b33 b34 b35 b36 b37 b38 b39 . . . b63 b64 b65 . . . b79 b80 b81 . . . b87 of total 88 (=32+32+16+8) bits may be used. Herein, b0-b31 indicate CSI-RSs of 1 antenna port, b32-b63 indicate CSI-RSs of 2 antenna ports, b64-b79 indicate CSI-RSs of 4 antenna ports, and b80-b87 indicate CSI-RSs of 8 antenna ports. Each bit of the bitmaps indicates whether path loss measurement is performed for the corresponding antenna port. For example, bit 1 indicates path loss measurement to be performed, bit 0 indicates no path loss measurement to be performed, and vice versa.

Other indication modes and path loss measurement modes of embodiment II may refer to embodiment I, which are not described in details redundantly.

The path loss $PL_{target}$ for uplink power control may be finally obtained according to formulae (4)-(6) above. The $PL_{target}$ obtained in this way is well-targeted, so that the performance of uplink power control is improved.

Embodiment III

Embodiment III may use the indication modes and path loss measurement modes of embodiment I and embodiment II, but the difference is that the reference signal port information of embodiment III may further include an identification bit. The identification bit indicates the function of the reference signal port information, and the UE performs measurement according to the identification bit.

For example, suppose that the identification bit 1 indicates that path loss measurement is performed on the corresponding antenna port, and the identification bit 0 indicates that the reference signal port information is used for CSI measurement. When the identification bit is 0, the UE measures the channel state information on the antenna port indicated by the reference signal port information, such as precoding matrix index (PMI), rank index (RI), channel quality information (CQI) and the like. In addition, when the identification bit is 1, RSRP is measured on the corresponding antenna port and the path loss is determined according to the measured RSRP and the reference signal power information.

Other indication modes and path loss measurement modes of embodiment II may refer to embodiment I and embodiment II, which are not described in details redundantly.

The path loss $PL_{target}$ for uplink power control may be finally obtained according to formulae (4)-(6) above. The $PL_{target}$ obtained in this way is well-targeted, so that the performance of uplink power control is improved. Moreover, the CSI-RS may still be used for CSI feedback, so that the flexibility of application is improved.

Embodiment IV

In the embodiments above, the reference signal port information is in a mode of explicit indication. Implicit indication is adopted in the embodiments below. For example, two or more indication modes are combined to indicate whether a path loss measurement is performed on a corresponding antenna port based on CSI-RS.

In this embodiment, the reference signal port information may include a first group of CSI-RS configuration information similar to the bitmap or the bitmap concatenation in the aforementioned embodiments I to III, but the bitmap or the bitmap concatenation indicates that the UE measures the RSRP of the CSI-RS signal on the corresponding antenna port.

For example, the bitmap "1010000000000000000000000000000" indicates that the UE measures the RSRP on the first antenna port (suppose that the antenna port is CSI_RS1) corresponding to the corresponding first CSI-RS pattern in table 1. Meanwhile, the UE measures the RSRP on the first antenna port (suppose that the antenna port is CSI_RS2) corresponding to the corresponding third CSI-RS pattern in table 1. That is to say, the first group of CSI-RS configuration information includes a set consisting of RSRP measurement indications of respective antenna ports.

Moreover, the reference signal port information may further include a second group of CSI-RS configuration information, for indicating the antenna port for path loss measurement as combined with the first group of CSI-RS configuration information. In this embodiment, the second group of CSI-RS configuration information may be a subset selection indication of the set of the RSRP measurement indications, such as an indication bitmap corresponding to the set.

For example, suppose that the set of CSI-RS antenna ports, configured by the eNodeB and used for the UE to measure the RSRP, is {CSI_RS(i)}, where 0<i<=M, and M is a positive integer. Thus, the indication bitmap of M bits may be configured to indicate the CSI-RS antenna port for path loss measurement. M=3 is taken as an example, where if the set {CSI_RS(i)} is {CSI_RS(1),CSI_RS(6),CSI_RS (9)} and the bitmap of the CSI-RS for indicating the path loss measurement is 011, the subset {CSI_RS(6),CSI_RS (9)} is selected for the path loss measurement.

In such case, the reference signal power information will be configured as Pd6 and Pd9. Pd6 is the CSI-RS transmitting power of the CSI_RS(6) antenna port, and Pd9 is the CSI-RS transmitting power of the CSI_RS(9) antenna port; or Pd6 is the difference between the CSI-RS transmitting power of the CSI_RS(6) antenna port and the CRS transmitting power, and Pd9 is the difference between the CSI-RS transmitting power of the CSI_RS(9) antenna port and the CRS transmitting power. The path loss $PL_{target}$ for uplink power control may be similarly calculated according to the aforementioned formulae (4)-(6). The $PL_{target}$ obtained in this way is well-targeted, so that the performance of uplink power control is improved, and measurement of RSRPs of multiple antenna ports can be supported.

Other indication modes and path loss measurement modes of embodiment II may refer to embodiment I to embodiment III, which are not described in details redundantly.

Embodiment V

The difference between embodiment V and embodiment IV is that the second group of CSI-RS configuration information may use CSI-RS muting information configured by a base station. The first group of CSI-RS configuration information indicates a set consisting of RSRP measurement indications of respective antenna ports likewise.

The CSI-RS muting information is bitmap information of 16 bits. When the first group of CSI-RS configuration information adopts CSI-RS configurations of 1 antenna port, if the CSI-RS of a certain 1 antenna port is selected for RSRP measurement and the CSI-RSs of 4 antenna ports corresponding to the muting bit and the CSI-RS of the 1 antenna port indicated by the first group have an intersection, the UE performs path loss measurement based on the CSI-RS of the 1 antenna port.

For example, if the muting information of the CSI-RS is 1000000000000100, the CSI-RSs of 4 antenna ports in which $n_s$ mod 2=0 and of which the location corresponds to (9, 5) in the antenna ports indicated by the first bit are muting, and the CSI-RSs of 4 antenna ports in which $n_s$ mod 2=1 and of which the location corresponds to (10, 1) in the antenna ports indicated by the fourteenth bit are muting. In the antenna ports corresponding to "1010000000000000000000000000000" in the first group of configuration information, the antenna ports in which $n_s$ mod 2=0 and of which the location corresponds to (9, 5) are selected for RSRP measurement, and the antenna ports in which $n_s$ mod 2=1 and of which the location corresponds to (9, 2) are selected for RSRP measurement. In the two groups of configuration information, all RRHs in which $n_s$ mod 2=0 and of which the time-frequency location is (9, 5) are configured, namely, the two groups of configuration information have an intersection on the antenna ports corresponding to the RRHs, and the UE performs path loss measurement based on the antenna ports.

The $PL_{target}$ for uplink power control may be similarly calculated according to the aforementioned formulae (4)-(6). The $PL_{target}$ obtained in this way is well-targeted, so that the performance of uplink power control is improved. Moreover, the signaling overhead may be reduced through combinative coding in conjunction with the existing muting information.

Other indication modes and path loss measurement modes of embodiment II may refer to embodiment I to embodiment IV, which are not described in details redundantly.

The embodiments above are not completely independent, and may be combined as required. These variations fall into the scope of the embodiments of the present disclosure.

For example, embodiment IV and embodiment V above may be combined, where the first group of configuration information indicates that the UE measures the RSRP of the CSI-RS on the corresponding antenna port, and the second group of configuration information is the CSI-RS muting information and is combined with the first group of configuration information to combinatively indicate on which antenna ports the path loss measurement is performed.

Or, embodiment III and embodiment IV/V above may be combined, where the UE determines, according to an identification bit transmitted by the eNodeB through a high-layer signaling or a dynamic signaling, whether the first group of configuration information indicates RSRP measurement or CSI measurement. In the case where the first group of configuration information indicates the RSRP measurement, the second group of configuration information may also use the CSI-RS muting information or the subset selection indication of the set, to combinatively indicate on which antenna ports the path loss measurement is performed.

Figure 4:
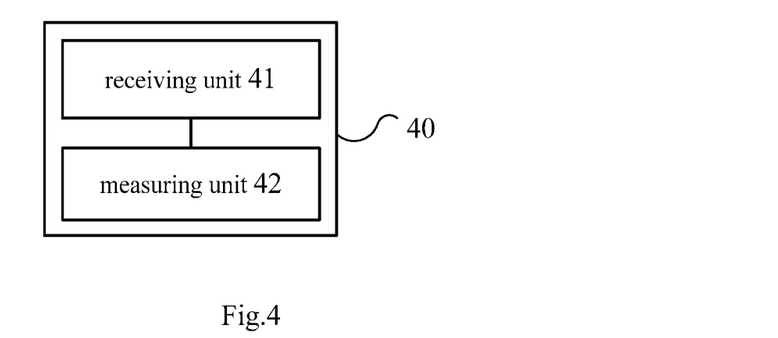
FIG. 4 is a block diagram of a user equipment of an embodiment of the present disclosure.

FIG. 4 is a block diagram of a user equipment of an embodiment of the present disclosure. The user equipment 40 of FIG. 4 includes a receiving unit 41 and a measuring unit 42.

The receiving unit 41 is configured to receive configuration information of a channel state information reference signal CSI-RS from a base station, wherein the configuration information of the CSI-RS includes reference signal port information and reference signal power information; and the measuring unit is configured to measure a path loss for uplink power control based on the configuration information of the CSI-RS.

The embodiment of the present disclosure uses the CSI-RS to measure the path loss, which differs from a common CRS in that the CSI-RS may aim at a specific base station. Therefore, path loss measurement may be performed in respect of a target base station of uplink transmission, enabling the path loss compensation to match the actual path loss, thus improving the performance of uplink power control.

The user equipment 40 may perform respective processes of the method shown in FIG. 1, and may determine the path loss for uplink power control according to the embodiments I to V. Therefore, in order to avoid repetition, detailed description is appropriately omitted.

Alternatively, as an embodiment, the measuring unit 42 may determine an antenna port to be measured based on the reference signal port information, measure the RSRP of the CSI-RS on the determined antenna port and determine the path loss according to the measured RSRP and the reference signal power information.

Alternatively, as another embodiment, the configuration information received by the receiving unit 41 may include an identification bit for indicating the function of the reference signal port information. When the identification bit indicates that the reference signal port information is used for CSI measurement, the measuring unit 42 is further configured to measure the CSI on the antenna port indicated by the reference signal port information. When the identification bit indicates that the reference signal port information is used for RSRP measurement, the measuring unit 42 measures the RSRP of the CSI-RS on the determined antenna port and determines the path loss according to the measured RSRP and the reference signal power information, for example, as described in the embodiment III above.

Alternatively, as another embodiment, the receiving unit 41 may receive the configuration information through a high-layer signaling or a dynamic signaling. Various information included in the configuration information may be received together or separately. For example, the reference signal port information and the reference signal power information do not need to be subjected to one-to-one correspondence. In the case where the configuration information includes the identification bit, the identification bit may be transmitted through a high-layer signaling or a dynamic signaling, for example, may be transmitted together with the reference signal port information and the reference signal power information above or separately transmitted. Moreover, the identification bit is not required to be in one-to-one correspondence to the reference signal port information.

Alternatively, as another embodiment, the reference signal port information received by the receiving unit 41 may include a set consisting of path loss measurement indications of respective antenna ports, as mentioned in embodiment I above. Or, the reference signal port information received by the receiving unit 41 may include a set consisting of RSRP measurement indications of respective antenna ports and CSI-RS muting information configured by the base station, as mentioned in embodiment V above. Or, the reference signal port information received by the receiving unit 41 may include a set consisting of RSRP measurement indications of respective antenna ports and a subset selection indication of the set, as described in embodiment IV above.

Alternatively, as another embodiment, the set consisting of the RSRP measurement indications of respective antenna ports includes a reference signal port bitmap of CSI-RS configurations of 1 antenna port, or includes a concatenation of reference signal port bitmaps of CSI-RS configurations of all the antenna port numbers.

Alternatively, as another embodiment, the subset selection indication of the set includes an indication bitmap corresponding to the set.

Alternatively, as another embodiment, the reference signal power information includes a transmitting power of the CSI-RS, or includes a difference between a transmitting power of the CSI-RS and a transmitting power of a common reference signal CRS.

Alternatively, as another embodiment, when the reference signal power information includes the transmitting power of the CSI-RS, the path loss measured by the measuring unit 42 is equal to the value of subtracting the RSRP from the transmitting power of the CSI-RS, as shown in the aforementioned formula (6). When the reference signal power information includes the difference between the transmitting power of the CSI-RS and the transmitting power of the CRS, the path loss measured by the measuring unit 42 is equal to the value of subtracting the RSRP from the sum of the difference and the transmitting power of the CRS, as shown in the aforementioned formula (5).

Alternatively, as another embodiment, when it is determined, based on the reference signal port information, that multiple antenna ports are to be measured, the measuring unit is specifically configured to determine the path loss of each of the multiple antenna ports and determine the path loss for uplink power control according to the path loss of each antenna port, as shown in the aforementioned formula (4).

The user equipment 40 of the embodiment of the present disclosure uses the CSI-RS to measure the path loss, which differs from a common CRS in that the CSI-RS may aim at the specific base station. Therefore, path loss measurement may be performed in respect of a target base station of uplink transmission, enabling the path loss compensation to match the actual path loss, thus improving the performance of uplink power control.

Figure 5:
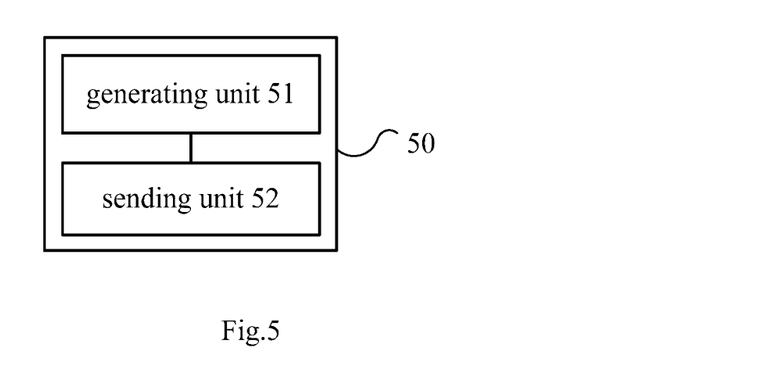
FIG. 5 is a block diagram of a base station of an embodiment of the present disclosure.

FIG. 5 is a block diagram of a base station of an embodiment of the present disclosure. The base station 50 of FIG. 5 includes a generating unit 51 and a sending unit 52.

The generating unit 51 is configured to generate configuration information of a channel state information reference signal CSI-RS, wherein the configuration information of the CSI-RS includes reference signal port information and reference signal power information. The sending unit 52 is configured to send the configuration information of the CSI-RS to user equipment, for the user equipment to measure a path loss for uplink power control based on the configuration information of the CSI-RS.

The embodiment of the present disclosure uses the CSI-RS to measure the path loss, which differs from a common CRS in that the CSI-RS may aim at the specific base station. Therefore, path loss measurement may be performed in respect of a target base station of uplink transmission, enabling the path loss compensation to match the actual path loss, thus improving the performance of uplink power control.

The base station 50 may perform respective processes of the method shown in FIG. 2, and may enable the user equipment to determine the path loss for uplink power control according to embodiments I to V. Therefore, in order to avoid repetition, detailed description is appropriately omitted.

Alternatively, as an embodiment, the configuration information generated by the generating unit 51 further includes an identification bit for indicating the function of the reference signal port information. When the identification bit indicates that the reference signal port information is used for CSI measurement, the configuration information sent by the sending unit 52 enables the user equipment to measure the CSI on the antenna port indicated by the reference signal port information. When the identification bit indicates that the reference signal port information is used for RSRP measurement, the configuration information sent by the sending unit 52 enables the user equipment to measure the RSRP of the CSI-RS on the determined antenna port and determine the path loss according to the measured RSRP and the reference signal power information.

Alternatively, as another embodiment, the reference signal port information generated by the generating unit 51 may include a set consisting of path loss measurement indications of respective antenna ports. Or, the reference signal port information generated by the generating unit 51 may include a set consisting of RSRP measurement indications of respective antenna ports and CSI-RS muting information configured by the base station. Or, the reference signal port information generated by the generating unit 51 includes a set consisting of RSRP measurement indications of respective antenna ports and a subset selection indication of the set.

Alternatively, as another embodiment, the set consisting of the RSRP measurement indications of respective antenna ports includes a reference signal port bitmap of 1 CSI-RS antenna port configuration, or includes a concatenation of reference signal port bitmaps of all CSI-RS antenna port configuration numbers.

Alternatively, as another embodiment, the subset selection indication of the set includes an indication bitmap corresponding to the set.

Alternatively, as another embodiment, the reference signal power information generated by the generating unit 51 may include a transmitting power of the CSI-RS, or comprises a difference between a transmitting power of the CSI-RS and a transmitting power of a common reference signal CRS.

Alternatively, as another embodiment, the sending unit 52 may send the configuration information of the CSI-RS to the user equipment through a high-layer signaling or a dynamic signaling. Various information included in the configuration information may be sent together or separately. For example, the reference signal port information and the reference signal power information do not need to be subjected to one-to-one correspondence. In the case where the configuration information includes the identification bit, the identification bit may be transmitted through a high-layer signaling or a dynamic signaling, for example, may be transmitted together with the reference signal port information and the reference signal power information above or separately transmitted. Moreover, the identification bit is not required to be in one-to-one correspondence to the reference signal port information.

The base station 50 of the embodiment of the present disclosure enables the user equipment to use the CSI-RS to measure the path loss, which differs from a common CRS in that the CSI-RS may aim at the specific base station. Therefore, path loss measurement may be performed in respect of a target base station of uplink transmission, enabling the path loss compensation to match the actual path loss, thus improving the performance of uplink power control.

A communication system according to an embodiment of the present disclosure may include the aforementioned user equipment 40 or base station 50.

Those of ordinary skill in the art can realize that the units and algorithmic steps of the examples described in conjunction with the embodiments disclosed herein may be realized by electronic hardware or the combination of computer software and electronic hardware. Whether these functions are executed in a hardware or software mode depends on the specific applications and design constraint conditions of the technical solution. For each specific application, professionals may realize the described functions by different methods, but this realization shall not be considered as being beyond the scope of the present disclosure.

Those skilled in the art to which the present disclosure pertains may clearly understand that, for the purpose of better convenience and briefness in description, for the specific working processes of the above-described systems, devices and units, reference could be made to the corresponding processes in the embodiments of the aforementioned methods, and repeated description is not given here.

In the several embodiments provided in the application, it shall be understood that the disclosed systems, devices and methods may be realized in other modes. For example, the embodiments of the above-described devices are only exemplary, for example, the division of the units is only a logic function division, other division modes may be adopted in practice, e.g., multiple units or components may be combined or integrated in another system, or some characteristics may be omitted or be not executed. From another point of view, the displayed or discussed mutual coupling or direct coupling or communication connection may be indirect coupling or communication connection of devices or units through some interfaces, and may also be in electrical, mechanical or other forms.

The units illustrated as separate components may be or may not be physically separated, and the components displayed as units may be or may not be physical units, that is to say, the components may be positioned at one place or may also be distributed on multiple network units. The objective of the solution of the embodiments may be fulfilled by selecting part of or all of the units according to actual needs.

In addition, in various embodiments of the present disclosure, the functional units may be integrated in one processing unit, or the functional units may separately and physically exist, or two or more units may be integrated in one unit.

When the functions are realized in the form of software functional units and sold or used as independent products, the functions may be stored in a computer-readable storage medium. Based on such an understanding, the technical solution of the present disclosure substantially, or the part of the present disclosure making contribution to the prior art, or a part of the technical solution may be embodied in the form of a software product, and the computer software product is stored in a storage medium, which includes a plurality of instructions enabling computer equipment (which may be a personal computer, a server, network equipment or the like) to execute all of or part of the steps in the methods of the embodiments of the present disclosure. The aforementioned storage medium includes: various media capable of storing program codes, such as USB disk, mobile hard disk, read-only memory (ROM), random access memory (RAM), disk, optical disk or the like.

Described above are the specific embodiments of the present disclosure only, but the protection scope of the present disclosure is not limited to this, those skilled who are familiar with the art could readily think of variations or substitutions within the technical scope disclosed by the present disclosure, and these variations or substitutions shall fall within the protection scope of the present disclosure. Thus, the protection scope of the present disclosure should be defined by the claims.

What is claimed is:

1. An uplink power control method, comprising:
receiving configuration information of a channel state information reference signal (CSI-RS) from a base station, wherein the configuration information of the CSI-RS comprises reference signal port information and reference signal power information, wherein the reference signal power information comprises a difference between a transmitting power of the CSI-RS and a transmitting power of a common reference signal;
determining an antenna port to be measured based on the reference signal port information;
measuring a reference signal receiving power (RSRP) of the CSI-RS on the antenna port; and
determining a path loss according to the measured RSRP and the reference signal power information, wherein determining the path loss comprises determining that the path loss is equal to a value of subtracting the measured RSRP from a sum of the transmitting power of the common reference signal and the difference between the transmitting power of the CSI-RS and the transmitting power of the common reference signal;
wherein the configuration information further comprises identification bits for indicating a function of the reference signal port information, and when the identification bits indicate that the reference signal port information is used for channel state information measurement, the method further comprises measuring the channel state information on the antenna port indicated by the reference signal port information.

2. The method according to claim 1, wherein the identification bits are transmitted through a dynamic signaling or a high-layer signaling.

3. The method according to claim 1, wherein the reference signal port information comprises a set of path loss measurement indications of respective antenna ports.

4. The method according to claim 1, wherein the reference signal port information comprises a set of RSRP measurement indications of respective antenna ports and CSI-RS muting information configured by the base station.

5. The method according to claim 1,
wherein the reference signal port information comprises a set of RSRP measurement indications of respective antenna ports and a subset selection indication of the set of RSRP measurement indications of respective antenna ports.

6. The method according to claim 1, further comprising:
determining, based on the reference signal port information, that multiple antenna ports are to be measured, and the determining the path loss according to the measured RSRP and the reference signal power information comprises:
calculating the path loss ($PL_{target}$) for uplink power control according to a formula:

$$PL_{target} = -10\log\sum_{i} \omega_i 10^{\frac{PL_i}{10}}$$

wherein $PL_i$ is a path loss corresponding to an antenna port, and $\omega_i$ is a weight factor.

7. A user equipment, comprising:
a receiver configured to receive configuration information of a channel state information reference signal (CSI-RS) from a base station, wherein the configuration information of the CSI-RS comprises reference signal port information and reference signal power information, wherein the reference signal power information comprises a difference between a transmitting power of the CSI-RS and a transmitting power of a common reference signal; and
a processor configured to:
determine an antenna port to be measured based on the reference signal port information,
measure a reference signal receiving power (RSRP) of the CSI-RS on the antenna port,
determine a path loss according to the measured RSRP and the reference signal power information, and
determine, based on the reference signal port information, that multiple antenna ports are to be measured,
wherein determining the path loss according to the measured RSRP and the reference signal power information comprises: averaging the RSRP measured on one or more subsets of the multiple antenna ports, then obtaining path losses corresponding to the one or more subsets according to the averaged RSRP, and obtaining the path loss for uplink power control according to the corresponding path losses,
wherein the configuration information further comprises an identification bits for indicating a function of the reference signal port information, and when the identification bits indicate that the reference signal port information is used for channel state information measurement, the processor is further configured to measure the channel state information on the antenna port indicated by the reference signal port information.

8. The user equipment according to claim 7, wherein the identification bits are transmitted through a dynamic signaling or a high-layer signaling.

9. The user equipment according to claim 7, wherein the reference signal port information comprises a set of path loss measurement indications of respective antenna ports.

10. The user equipment according to claim 7, wherein the reference signal port information comprises a set of RSRP measurement indications of respective antenna ports and CSI-RS muting information configured by the base station.

11. The user equipment according to claim 7,
wherein the reference signal port information comprises a set of RSRP measurement indications of respective antenna ports and a subset selection indication of the set of RSRP measurement indications of respective antenna ports.

12. A non-transitory computer-readable storage medium storing instructions that, when executed by a processor, cause a computer to carry out the steps of:
receiving configuration information of a channel state information reference signal (CSI-RS) from a base station, wherein the configuration information of the CSI-RS comprises reference signal port information and reference signal power information, wherein the reference signal power information comprises a difference between a transmitting power of the CSI-RS and a transmitting power of a common reference signal;
determining an antenna port to be measured based on the reference signal port information;
measuring a reference signal receiving power (RSRP) of the CSI-RS on the antenna port; and
determining a path loss according to the measured RSRP and the reference signal power information, wherein determining the path loss comprises determining that the path loss is equal to a value of subtracting the measured RSRP from a sum of the transmitting power of the common reference signal and the difference between the transmitting power of the CSI-RS and the transmitting power of the common reference signal;
wherein the configuration information further comprises identification bits for indicating a function of the reference signal port information, and when the identification bits indicate that the reference signal port information is used for channel state information measurement, the computer further carries out the step of measuring the channel state information on the antenna port indicated by the reference signal port information.

* * * * *